(12) United States Patent
Casserini et al.

(10) Patent No.: US 12,468,780 B2
(45) Date of Patent: Nov. 11, 2025

(54) BALANCING FEATURE DISTRIBUTIONS USING AN IMPORTANCE FACTOR

(71) Applicant: Oracle International Corporation, Redwood Shores, CA (US)

(72) Inventors: Matteo Casserini, Zurich (CH); Saeid Allahdadian, Vancouver (CA); Felix Schmidt, Baden-Daettwil (CH); Andrew Brownsword, Vancouver (CA)

(73) Assignee: Oracle International Corporation, Redwood Shores, CA (US)

( * ) Notice: Subject to any disclaimer, the term of this patent is extended or adjusted under 35 U.S.C. 154(b) by 942 days.

(21) Appl. No.: 17/380,731

(22) Filed: Jul. 20, 2021

(65) Prior Publication Data

US 2023/0024884 A1    Jan. 26, 2023

(51) Int. Cl.
*G06F 16/35* (2025.01)
*G06F 18/21* (2023.01)
(Continued)

(52) U.S. Cl.
CPC ........ *G06F 18/217* (2023.01); *G06F 18/2113* (2023.01); *G06F 40/279* (2020.01); *G06N 3/088* (2013.01)

(58) Field of Classification Search
CPC .. G06F 18/217; G06F 18/2113; G06F 40/279; G06N 3/088
See application file for complete search history.

(56) References Cited

U.S. PATENT DOCUMENTS

| | | | |
|---|---|---|---|
| 6,963,831 B1 * | 11/2005 | Epstein | G06F 40/216 704/9 |
| 11,537,902 B1 * | 12/2022 | Aydore | G06N 3/047 |

(Continued)

OTHER PUBLICATIONS

Zhou, Junlin, et al., "Unsupervised Learning Based Distributed Detection of Global Anomalies", 2010, International Journal of Information Technology and Decision Making, vol. 2010, Nov. 2010, pp. 1-11.

(Continued)

*Primary Examiner* — Kamran Afshar
*Assistant Examiner* — Steven Phung
(74) *Attorney, Agent, or Firm* — Hickman Becker Bingham Ledesma LLP

(57) ABSTRACT

Herein are machine learning techniques that adjust reconstruction loss of a reconstructive model such as an autoencoder based on importances of values of features. In an embodiment and before, during, or after training, the reconstructive model that more or less accurately reconstructs its input, a computer measures, for each distinct value of each feature, a respective importance that is not based on the reconstructive model. For example, importance may be based solely on a training corpus. For each feature during or after training, a respective original loss from the reconstructive model measures a difference between a value of the feature in an input and a reconstructed value of the feature generated by the reconstructive model. For each feature, the respective importance of the input value of the feature is applied to the respective original loss to generate a respective weighted loss. The weighted losses of the features of the input are collectively detected as anomalous or non-anomalous.

17 Claims, 7 Drawing Sheets

---

201 For each distinct value of each feature, measure respective importance that is not based on reconstructive model

↓

202 For each feature, measure respective original loss from reconstructive model

↓

203 For each feature, generate respective weighted loss based on original loss of feature and importance of value of feature

↓

204 Detect that weighted tuple loss is anomalous

(51) Int. Cl.
G06F 18/2113 (2023.01)
G06F 18/214 (2023.01)
G06F 40/279 (2020.01)
G06N 3/0455 (2023.01)
G06N 3/088 (2023.01)

(56) References Cited

U.S. PATENT DOCUMENTS

| | | | |
|---|---|---|---|
| 2011/0185233 A1* | 7/2011 | Belluomini | G06F 11/079 714/E11.029 |
| 2017/0169360 A1 | 6/2017 | Veeramachaneni et al. | |
| 2018/0109589 A1 | 4/2018 | Ozaki et al. | |
| 2018/0158078 A1* | 6/2018 | Hsieh | G06N 20/00 |
| 2019/0370695 A1 | 12/2019 | Chandwani et al. | |
| 2020/0004616 A1* | 1/2020 | Natsumeda | G06N 5/02 |
| 2020/0076841 A1 | 3/2020 | Hajimirsadeghi | |
| 2020/0175610 A1* | 6/2020 | Pikle | G06N 20/00 |
| 2020/0278408 A1* | 9/2020 | Sung | G06V 10/764 |
| 2020/0364585 A1 | 11/2020 | Chandrashekar | |
| 2020/0410289 A1* | 12/2020 | Arunmozhi | G06N 5/01 |
| 2021/0011832 A1 | 1/2021 | Togawa | |
| 2022/0138504 A1 | 5/2022 | Moghadam et al. | |
| 2022/0188410 A1 | 6/2022 | Allahdadian et al. | |
| 2022/0303288 A1* | 9/2022 | Wang | G06F 18/2113 |

OTHER PUBLICATIONS

Vikram, Adiya, et al., "Anomaly detection in Network Traffic Using Unsupervised Machine learning Approach", 2020 5th Intl Conf on Communication and Electronics Systems (ICCES), vol. 5 (2020), pp. 476-479, Jul. 10, 2020, 4pgs.
Angiulli, Fabrizio, "Concentration Free Outlier Detection", 2017, Machine Learning and Knowledge Discovery in Databases, vol. 2017, pp. 3-19.
Du et al. DeepLog: Anomaly Detection and Diagnosis from System Logs through Deep Learning, CCS'17, Oct. 30-Nov. 3, 2017, 14 pages.
Altmann et al., "Permutation Importance: A corrected Feature Importance Measure", Department of Computational Biology and Applied Algorithmics, Max Planck Institute for Informatics, vol. 00, No. 00 2009, Year 2009, 8 pages.
Kim et al., "Behavior-based anomaly detection on big data", Edith Cowan University, Research Online, dated 2015, 9 pages.
Kamei et al., "The Effects of Over and Under Sampling on Fault-Prone Module Detection", Nara Institute of Science and Technology Academic Repository, ESEM 2007, dated Sep. 2007, 10 pages.
Hu et al., "Anomalous User Activity Detection in Enterprise Multi-Source Logs", dated Nov. 2017, 8 pages.
Hasan et al., "Attack and Anomaly Detection in IoT Sensors in IoT Sites Using Machine Learning Approaches", Department of Computer Science and Engineering, Khulna University of Engineering & Technology, published by Elsevier B.V., Sep. 2019, 14 pages.
HaddadPajouh et al, "A Two-layer Dimension Reduction and Two-tier Classification Model for Anomaly-Based Intrusion Detection in IoT Backbone Networks", dated 2016, 12 pages.
Golan et al., "Deep Anomaly Detection Using Geometric Transformations", 32nd Conference on Neural Information Processing Systems (NeurIPS dated 2018), Montréal, Canada, 12 pages.
Goix, Nicolas, "How to Evaluate the Quality of Unsupervised Anomaly Detection Algorithms?", Presented at ICML2016 Anomaly Detection Workshop, New York, NY, USA, 2016, 13 pages.
Kolter et al., "Dynamic Weighted Majority: An Ensemble Method for Drifting Concepts", Journal of Machine Learning Research 8, dated 2007, 36 pages.
Ghosh et al., "Detecting Anomalous and Unknown Intrusions Against Programs", dated 1998, 9 pages.
Larasati et al., "Improve the Accuracy of Support Vector Machine Using Chi Square Statistic and Term Frequency Inverse Document Frequency on Movie Review Sentiment Analysis", Scientific Journal of Informatics, vol. 6, No. 1, dated May 2019, 21 pages.
Clemencon et al., "Scoring Anomalies: A M-estimation Formulation", Proceedings of the 16th International Conference on Artifical Intelligence and Statistics (AISTATS) 2013, vol. 31 of JMLR, 9 pgs.
Chawla, "Data Mining for Imbalanced Datasets: An Overview", Department of Computer Science and Engineering University of Notre Dame, https://www.researchgate.net/ publication/226755026, dated Jan. 2005, 16 pages.
Chandola et al., "Anomaly Detection : A Survey", ACM Computing Surveys, dated Sep. 2009, 75 pages.
Carta et al., "A Local Feature Engineering Strategy to Improve Network Anomaly Detection", Department of Mathematics and Computer Science, University of Cagliari, dated Oct. 21, 2020, 30 pages.
Buczak et al., "A Survey of Data Mining and Machine Learning Methods for Cyber Security Intrusion Detection", IEEE Communications Surveys & Tutorials, vol. 18, No. 2, Second Quarter 2016, 24 pages.
Brownlee_Jason, "A Gentle Introduction to Cross-Entropy for Machine Learning", dated Oct. 21, 2019, https://machinelearningmastery.com/cross-entropy-for-machine-learning/, 34 pages.
Bornelöv et al., "Selection of Significant Features Using Monte Carlo Feature Selection", Springer International Publishing, Year 2016, 14 pages.
Bontemps et al., "Collective Anomaly Detection Based on Long Short Term Memory Recurrent Neural Network", dated 2016, 12 pages.
Anonymous authors, "Versatile Outlier Detection With Outlier Preserving Distribution Mapping Autoencoders", conference paper at ICLR 2020, dated 2019, 13 pages.
Godoy, Daniel, "Understanding Binary cross-Entropy / Log Loss: a Visual explanation", dated Nov. 21, 2018, 13 pages.
Panday et al., "Feature Weighting as a Tool for Unsupervised Feature Selection", Information Processing Letters, https://doi.org/10.1016/j.ipl.2017.09.005, Year 2017, 12 pages.
Yousefi-Azar et al., "Autoencoder-based Feature Learning for Cyber Security Applications", dated 2017, 8 pages.
Wang et al., "Towards a Hierarchical Bayesian Model of Multi-View Anomaly Detection", Twenty-Ninth International Joint Conference on Artificial Intelligence, dated Jul. 11, 2020, 7 pages.
Tuor et al., "Deep Learning for Unsupervised Insider Threat Detection in Structured Cybersecurity Data Streams", dated Dec. 15, 2017, 9 pages.
Strobl et al., "Bias in Random Forest Variable Importance Measures: Illustrations,Sources and a Solution", Research Report Series, Report 40, http://epub.wu.ac.at/1274/, Sep. 2006, 22 pages.
Shipmon et al., "Time Series Anomaly Detection", Detection of Anomalous Drops with Limited Features and Sparse Examples in Noisy Highly Periodic Data, dated 2017, 9 pages.
Seleznyov et al., "Anomaly Intrusion Detection Systems: Handling Temporal Relations between Events", dated 1999, 12 pages.
Schubert et al., "On Evaluation of Outlier Rankings and Outlier Scores", dated 2012, 12 pages.
Sakurada et al., "Anomaly Detection Using Autoencoders with Nonlinear Dimensionality Reduction", MLSDA '14, Dec. 2, 2014, Gold Coast, QLD, Australia Copyright 2014 ACM, 8 pages.
Kolosnjaji et al., "Deep Learning for Classification of Malware System Call Sequences", dated 2016, 12 pages.
Rayana et al., "Sequential Ensemble Learning for Outlier Detection: A Bias-Variance Perspective", dated Sep. 18, 2016, 11 pages.
YuanZhong, Zhu, "Intrusion Detection Method based on Improved BP Neural Network Research", International Journal of Security and Its Applications vol. 10, No. 5 (2016) pp. 193-202.
Nguyen et al., "GEE: A Gradient-Based Explainable Variational Autoencoder for Network Anomaly Detection", https://ieeexplore.ieee.org/abstract/document/8802833, Mar. 2019, 10 pages.
Nguyen et al., "An Evaluation Method for Unsupervised Anomaly Detection Algorithms", Journal of Computer Science and Cybernetics, V.32, N.3, dated 2016, 14 pages.
Naseer et al., "Enhanced Network Anomaly Detection Based on Deep Neural Networks", Journal of Latex Class Files, vol. 14, No. 8, Aug. 2015, 16 pages.

(56) References Cited

OTHER PUBLICATIONS

Moustafa et al., "A Holistic Review of Network Anomaly Detection Systems: A comprehensive Survey", Journal of Network and Computer Applications, vol. 128, Feb. 15, 2019, pp. 33-55.
Mirza et al., "Computer Network Intrusion Detection Using Sequential LSTM Neural Networks Autoencoders", IEEE, dated 2018, 4 pages.
Malhotra et al., "LSTM-based Encoder-Decoder for Multi-sensor Anomaly Detection", Presented at ICML 2016 Anomaly Detection Workshop, New York, NY, USA, 2016. Copyright 2016—5 pages.
Malhotra et al., "Long Short Term Memory Networks for Anomaly Detection in Time Series", ESANN dated Apr. 2015 proceedings, 6 pages.
Luo et al., "A Revisit of Sparse Coding Based Anomaly Detection in Stacked RNN Framework", dated Oct. 2017, 9 pages.
Loganathan Gobinath et al., "Sequence to Sequence Pattern Learning Algorithm for Real-Time Anomaly Detection in Network Traffic", dated 2018 IEEE, dated May 13, 2018, pp. 1-4.
Sabokrou et al., "Real-Time Anomaly Detection and Localization in Crowded Scenes", dated 2015, 7 pages.
Hajimirsadeghi, U.S. Appl. No. 16/122,505, filed Sep. 5, 2018, Office Action, May 13, 2021.
Hajimirsadeghi, U.S. Appl. No. 16/122,505, filed Sep. 5, 2018, Notice of Allowance and Fees Due , Sep. 23, 2021.

\* cited by examiner

FIG. 4

FORMULA
401

$$w_{i,F}^{\text{idf}} := r_{i,F} \cdot \log \frac{\#D}{\#\{m \in D \mid v_F(m) = v_i\}}$$

FORMULA
402

$$L_{\text{mean}}^w(x, y) := \frac{1}{N} \sum_{j=1}^{N} w_j \cdot |x_j - y_j|^2$$

FORMULA
403

$$L_{\text{abs}}^w(x, y) := \frac{1}{N} \sum_{j=1}^{N} w_j \cdot |x_j - y_j|$$

FORMULA
404

$$L_{\text{cross}}^w(x, y) := \frac{1}{N} \sum_{j=1}^{N} -w_j \cdot \left( x_j \cdot \log y_j + (1 - x_j) \cdot \log(1 - y_j) \right)$$

BALANCING FEATURE DISTRIBUTIONS USING AN IMPORTANCE FACTOR

RELATED CASES

Incorporated herein by reference in their entirety are the following related U.S. patent applications.
U.S. patent application Ser. No. 17/199,563 "Multi-Stage Feature Extraction For Effective ML-Based Anomaly Detection On Structured Log Data" filed Mar. 12, 2021 by Amin Suzani et al.
U.S. patent application publication 2020/0364585 A1 "Modular Feature Extraction from Parsed Log Data" filed May 17, 2019 by Pavan Chandrashekar et al.
U.S. patent application Ser. No. 17/123,235 "Anomaly Detection in SS7 Control Network Using Reconstructive Neural Networks" filed Dec. 16, 2020 by Hamed Ahmadi et al.

FIELD OF THE INVENTION

The present invention relates to reconstructive models such as an autoencoder for anomaly detection. Herein are machine learning techniques that adjust reconstruction loss based on respective importances of values of features.

BACKGROUND

Anomaly detection is an important tool with various use cases in security such as fraud detection and intrusion detection. A powerful approach recently employed in anomaly detection involves machine learning (ML) models such as reconstructive neural networks such as an autoencoder. A technical problem is that an ML model is only as good as its training data. Model training may succumb to various data bias pathologies such as underfitting or overfitting. Underfitting means that an ML model has not learned to recognize some important natural patterns. Overfitting means that the ML model has learned false patterns such as based on noise in the training data. Overfitting and underfitting cause the ML model to inaccurately inference in a production environment after training.

A common challenge in training ML models is that a dataset used for training the model is often statistically imbalanced. For example, the frequencies of feature values or data classes (e.g. labels) are not uniform across the dataset. Such an imbalance can create a bias in an anomaly detector towards learning from the most frequently occurring values, which in turn can have a negative effect on performance metrics such as training time and/or inference accuracy in training or production.

Unfortunately, imbalanced data often occurs in real-world data and generally results in poor performance of an ML model. Imbalance in the data can be categorized into two kinds. In a first kind, the imbalance is in the samples or categories of the data. In other words, the categories of the data are not approximately equally represented. An example is an imbalance in the number of samples in each class of the data in a supervised classification learning framework, which can be compensated for by oversampling and undersampling.

A second kind of imbalance involves an imbalance of values distributions within one feature or between multiple features. In this kind of imbalance, each sample in the input data is generally a concatenation of several features, forming a feature vector. This kind of imbalance may be statistical, such as when a feature has a nonuniform values distribution or when two numeric features have different ranges or different frequencies of values, or may instead be due to a lack of equivalence between the structural representations of features composing the samples. For example, a one-hot encoded feature may be wider (i.e. have more bits) in a feature vector than a numeric feature even though the numeric feature may have more information content (e.g. a greater count of distinct possible values). Such differences in encoded feature widths may effectively distort how an ML model comparatively perceives different features. The state of the art does not address these various forms of this second kind of imbalance.

BRIEF DESCRIPTION OF THE DRAWINGS

In the drawings:
FIG. 4 depicts example mathematical formulae for preparing or using feature value importances.

DETAILED DESCRIPTION

Figure 1:
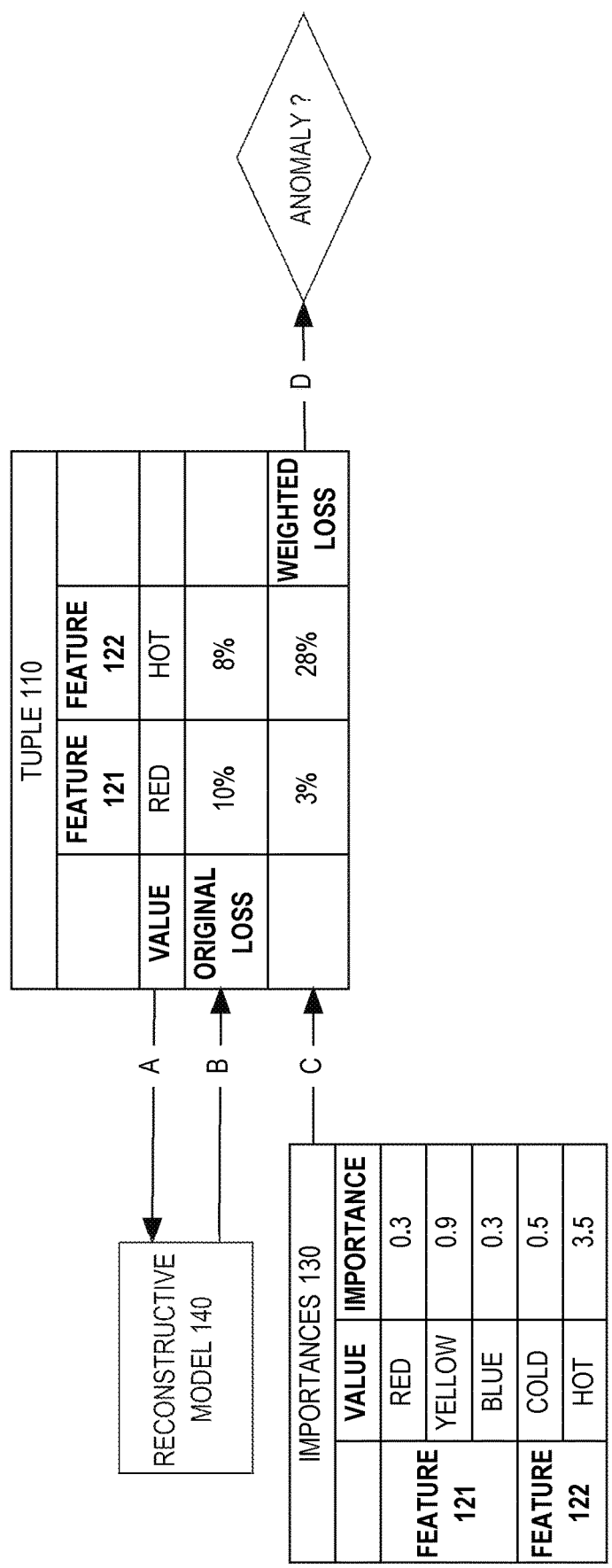
FIG. 1 is a block diagram that depicts an example computer that applies machine learning (ML) techniques to adjust reconstruction loss of a reconstructive model, such as an autoencoder, based on importances of values of features.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A reconstructive model is a machine learning (ML) model that can encode and decode a complex input, wherein decoding entails more or less accurate reconstruction of the original input from the encoding. For example, a reconstructive model may be an unsupervised autoencoder for anomaly detection. Herein are machine learning techniques that adjust quantifiable reconstruction loss based on respective importances of values of features.

For distinct values of a feature, respective importances are numeric weights that compensate for an imbalanced distribution of the values in a population of input samples such as a training corpus for a reconstructive model. Such imbalances of values distributions in features can have a negative effect on performance metrics of a reconstructive anomaly detection model, such as decreasing inference accuracy during or after training and/or increasing training time.

Importances are statistically measured in a population and then applied to reconstructive losses as multiplicative weighting coefficients for balancing and to avoid the negative effects of values distributions.

In an embodiment, loss function(s), such as used for an unsupervised reconstructive anomaly detector), weight different feature values based on importances that are measured based on inverse document frequency (idf). Such use of importances removes bias from imbalanced data by weighting a loss function toward infrequent values of each feature. Idf-based importances can be measured during training of a reconstructive model with negligible overhead and without simultaneously storing an entire training corpus in volatile memory.

In terms of time and space, this approach works well with an immense training corpus. Thus, this approach is computationally inexpensive and is widely applicable to large-scale data. With this approach, creation and curation of painstakingly balanced training sets from production data may be avoided, which encourages periodic retraining of a reconstructive model with most recent data.

Due to application neutrality of this approach, reconstructive anomaly detectors herein may be configured and trained for various domains such as network intrusion detection and datacenter health monitoring. For example, anomalies may be reliably detected in inputs consisting of individual or groups of items such as network packets or multi-packet messages, server or console log entries, database records or queries, or semi-structured documents such as JavaScript® object notation (JSON) or extensible markup language (XML).

Each input is composed of values for features that can be parsed, transformed, encoded, organized, and statistically analyzed according to feature automation techniques presented in related U.S. patent application publication 2020/0364585 A1. For example, an optimal feature encoding strategy can be discovered by analyzing a training corpus during a feature optimization phase that may occur before model training.

While analyzing the training data during feature optimization, importances of values of features can be measured based on the relative frequency of values in the data. As explained herein, various embodiments may measure or apply importances at various phases of the lifecycles of a training corpus and/or of a reconstructive model.

In an embodiment and before, during, or after training, a reconstructive model that more or less accurately reconstructs its input, a computer measures, for each distinct value of each feature, a respective importance that is not based on the reconstructive model. For example, importance may be based solely on a training corpus. For each feature during or after training, a respective original loss from the reconstructive model measures a difference between a value of the feature in an input and a reconstructed value of the feature generated by the reconstructive model. For each feature, the respective importance of the input value of the feature is applied to the respective original loss to generate a respective weighted loss. The weighted losses of the features of the input are collectively detected as anomalous or non-anomalous.

1.0 Example Computer

FIG. 1 is a block diagram that depicts an embodiment of an example computer 100 that applies machine learning (ML) techniques to adjust reconstruction loss of reconstructive model 140, such as an autoencoder, based on importances 130 of values of features 121-122. Computer 100 may be one or more of a rack server such as a blade, a personal computer, a mainframe, a virtual computer, a smartphone, or other computing device.

1.1 Reconstructive Model

Computer 100 stores and operates reconstructive model 140 that is an ML model, such as an autoencoder as discussed later herein, in memory. Reconstructive model 140 is operated to process a complex input, such as tuple 110, to generate an inference such as a prediction or classification. Reconstructive model 140 is any ML model that also more or less accurately regenerates its input, which includes features 121-122. Input reconstruction has different purposes at different phases in the lifecycle of reconstructive model 140 as follows.

Reconstructive model 140's lifecycle has two phases, which are laboratory training followed by production inferencing. Learning occurs during training, which input reconstruction may improve. Learning may entail internal adjustment of reconstructive model 140 based on measured error of model inferences. In other words, inferencing by reconstructive model 140 occurs during training and during operation in production. Depending on the scenario and embodiment as discussed later herein, reconstructive model 140 is or is not already trained.

1.2 Training Corpus

Training entails reconstructive model 140 generating inferences for many tuples in a training corpus. Each tuple in the training corpus has a preferably realistic and possibly distinct combination of respective values for features 121-122. For example, the value of feature 121 in tuple 110 is red. In various scenarios discussed later herein, the training corpus does or does not contain tuple 110. Inferencing occurs when reconstructive model 140 is applied to a tuple as shown by arrow A that indicates injection of the values of tuple 110 into reconstructive model 140. As explained later herein, arrows A-D occur in a temporal ordering as their lettering suggests. For example, arrow A occurs first, and arrow D occurs last.

In the real world, duplicate tuples or duplicate portions of tuples may occur with various natural frequencies. When frequencies or absence of those duplicates are different (i.e. imbalanced) in the training corpus than the natural frequencies, then the result of training reconstructive model 140 may be underfitting or overfitting. Underfitting means that reconstructive model 140 has not learned to recognize some important natural patterns. Overfitting means that reconstructive model 140 has learned false patterns such as based on noise in the training corpus. Overfitting and underfitting cause reconstructive model 140 to inaccurately inference.

1.3 Respective Importance of a Distinct Value of a Feature

Computer 100 uses importances 130 of respective values of respective features 121-122 to compensate for imbalances of values in the training corpus, thereby increasing the accuracy of reconstructive model 140. Importances 130 are numeric weights that indicate the relative natural significance of the value for each feature in any tuple such as tuple 110 that is discussed later herein.

In various embodiments, importances 130 range from zero to one such as a probability that a value of a feature is important or is the most important value of the feature or from zero to a hundred such as a percentage of relative importance. In various embodiments, importances 130 must or might not sum to a probability of one or a hundred percent, or can or cannot sum to more than one or a hundred. For example, the importances of values of feature 122 are 0.5 and 3.5 as shown and may be neither a probability nor a percent as discussed later herein. In any case, a higher importance value indicates greater importance, and zero indicates irrelevance.

For example as shown in importances 130, feature 121 has three possible values, and feature 122 has two possible values. In some cases two features may share some value(s) such as when value ranges overlap. For example, an age may range from zero to a hundred and a temperature may range from 32 to 212, in which case both features share fifty as a possible value. Both features may have different respective importances for the value of fifty.

Ideal feature value importance is more or less a covariance between a particular value of a feature and labels of tuples that do or do not have that value for that feature. A label is a known correct inference for a tuple. Thus, a particular value of a feature is more important if the presence or absence of that value of the feature in tuples is correlated with variations in the labels of the tuples such that the feature value appears to cause the labels. Conversely, a particular value of the feature is less important if variations in that value of the feature is uncorrelated with variations in the labels of the tuples such that the feature value has little or no effect on the labels.

However, ideal feature value importance is unavailable when labels (i.e. known correct inferences) are unavailable. Labeling tuples is usually very expensive in terms of manual labor as measured in time and expertise. Likewise, the training corpus may have thousands or millions of tuples, in which case labeling may be infeasible. Importances 130 instead are proxies that more or less approximate ideal feature importance based on readily available information in the (e.g. unlabeled) training corpus instead of labels. Because importances 130 are based solely on a population of tuples such as a training corpus, and not based on reconstructive model 140, importances 130 have some operational advantages.

1.4 Example Uses of Feature Value Importances

First, importances 130 are model-agnostic and can be reused for different ML models regardless of the architecture, algorithm, and hyperparameter settings of an ML model and even if those model details are unintelligibly complex or unavailable such as with a so-called black box (i.e. opaque) ML model. For example, computer 100 can use importances 130 even if reconstructive model 140 is instead hosted on a different computer so long as the different computer sends feature reconstruction loss measurements, as discussed later herein, back to computer 100.

Second, importances 130 may be measured as soon as the training corpus is available such as before or during training. Acceleration may be achieved if training reconstructive model 140 and measuring importances 130 are combined because both activities entail using the (e.g. huge) training corpus. Importances 130 may provide insights into a multidimensional problem space, as discussed later herein, before reconstructive model 140 has even been selected. Thus, importances 130 may be considered when selecting and configuring reconstructive model 140. For example, feature selection may configure which subset of features are used for inferencing, which may entail including features whose individual or combined value importances exceed an inclusion threshold or excluding features whose value importances does not exceed an exclusion threshold.

An embodiment of feature selection may rank (i.e. sort) features by individual or combined value importance, in which case feature selection may entail including a fixed fraction (e.g. two thirds) of features that rank better or including a top fixed count of features that rank better. Feature selection decreases the amount of features participating in training and production operation, which can save time and space and increase accuracy by preventing overfitting. Before or after training, importances and/or feature selection may facilitate ML explainability (MLX) that generates explanations of ML model behavior, and importances are or are not expressly included in an explanation.

1.5 Input Features

In an embodiment, an input tuple is provided as a feature vector (not shown) that contains a respective value for each of all features 121-122. In an embodiment, the feature vector is homogenous such that respective values of all features are encoded as a same datatype such as a same primitive datatype such as an integer or a unit normalized real number such as floating point. In an embodiment, the feature vector is heterogenous such that each feature may have its own respective datatype.

In an embodiment, a sequential feature such as a calendar month may be encoded as a zero or one based unsigned integer such as 1-12 instead of as text strings such as January. In an embodiment, categorical features such as a feature of unordered and mutually exclusive choices such as tea flavors may be so-called one-hot encoded as a group of mutually exclusive Boolean features. For example, one choice from three flavors may be encoded into three Boolean features in which the corresponding feature is true and the two other Boolean features are false in the feature vector. In an embodiment, a Boolean feature is encoded as a number.

The implementation of a feature's loss function compares the original and reconstructed values of the feature to calculate a numeric score that measures a magnitude of a difference between the original and reconstructed values of the feature. In various embodiments, respective loss functions of different features each returns a reconstruction loss in a same or different numeric range that is respectively normalized or not. For example, some or all loss functions may return a real number in the range of zero to one where zero means perfect reconstruction of an exact match and one means that the reconstruction has no resemblance to the original value. Here loss is, mathematically or informally, the opposite of accuracy.

Techniques herein are robust to support other loss ranges that may include negative and positive values and/or unnormalized values. Compensation for such diversity of values may entail squaring and/or range normalization.

1.6 Autoencoder

In an embodiment, reconstructive model 140 is an autoencoder. Backpropagation training of an artificial neural network (ANN) such as an autoencoder as discussed later herein may be driven by model loss. With supervised training, model loss may be measured by comparing an inference by an ML model to a predefined label that is already established as the correct inference. With unsupervised training, such as with an autoencoder, predefined labels may be unavailable, and loss may instead be measured based on diagnostic output from the autoencoder as follows.

In an embodiment, an autoencoder may be a multilayer perceptron (MLP) that generally provides dimensionality reduction, regardless of whether the autoencoder is used for classification or anomaly detection. As discussed above, classification entails associating an inferred label with a complex input. In other words, classification entails recognizing a learned pattern. Anomaly detection does the opposite, which is recognizing that an input does not match any learned pattern.

In any case, an autoencoder provides dimensionality reduction, which: a) entails avoiding analysis and integration of irrelevant features of an input, and b) generating a more concise internal neural representation of the input in which only meaningful input features are retained. In other words, an autoencoder extracts semantic details of a complex, noisy, and fuzzy input. Thus, the autoencoder converts a sparse representation of an input into a dense encoding. Features and feature representation are discussed later herein.

Generally during training, an autoencoder learns which features should be deemphasized and how to encode retained semantic features. An autoencoder herein further is a reconstructive model because the autoencoder contains additional neural layers that are trained to regenerate the original input (i.e. tuple). In other words, the autoencoder encodes input into a semantic coding, which the autoencoder further decodes back into a more or less accurate copy of the input.

In an embodiment, reconstructive model 140 instead is a principal component analysis (PCA). Although operationally very different from an autoencoder, PCA is a reconstructive model that is functionally similar to an autoencoder as follows. Like an autoencoder, PCA undergoes unsupervised training to learn dimensionality reduction and minimize reconstruction loss. Architectures and techniques for PCA and autoencoders as reconstructive models are discussed later herein and in related U.S. patent application Ser. No. 17/123,235.

1.7 Reconstruction Loss

A measured difference between the original input and the regenerated input is known as reconstruction loss. Because the original input and the regenerated input are composed of individual features, a difference may be measured between an original feature and a reconstructed feature to calculate a respective reconstruction loss for that feature, shown as original loss that reconstructive model 140 provides as shown by arrow B. In other words, a respective original loss may be measured for each of features 121-122. For example as shown, feature 121 has an original loss of ten percent. For example if red is reconstructed as pink, then the loss is small, but if red is reconstructed as blue then the loss is large.

In various embodiments, loss for one feature ranges from zero to one such as a probability that the reconstructed feature is inaccurate or from zero to a hundred such as a percentage of difference between the reconstructed feature and the original feature. In various embodiments, losses for features 121-122 must or might not sum to a probability of one or a hundred percent, or can or cannot sum to more than one or a hundred.

In any case, a lower loss indicates greater accuracy, and zero indicates that the reconstructed feature is identical to the original feature. Conversely, a maximum loss indicates that the reconstructed feature has no resemblance to the original feature. Although presented as an empirically observed measurement, reconstruction loss actually is calculated by a loss function as discussed later herein.

For one input tuple, reconstructive model 140 may generate two outputs that are: a) a more or less accurate inference and b) the feature reconstruction losses. In contrast to reconstruction loss, inference error is a difference between the actual inference by reconstructive model 140 and the known correct inference (i.e. label). When reconstructive model 140 is used for (e.g. binary) classification such as anomaly detection, reconstruction loss may be used as a proxy for inference error and, as discussed later herein, a proxy for the inference itself. Such use of reconstruction loss is especially important for unsupervised learning because, without predefined labels, inference error may be more or less impossible to measure. Thus reconstruction loss, instead of inference error, may be used for unsupervised learning by a reconstructive model such as for backpropagation for unsupervised training of an autoencoder.

1.8 Value Loss and Tuple Loss

Herein are two granularities of reconstruction loss that may have a same scale and a same unit of measurement. Value loss is reconstruction loss for one feature in one tuple. Tuple loss is an aggregate of value losses of all features in one tuple.

Aggregation, such as summing or averaging, of respective value losses of all features 121-122 may be used to calculate tuple loss that measures how much relevant information did reconstructive model 140 lose when inferencing for an input tuple. As discussed below, loss may indicate reconstruction loss that occurs in a regenerated input as compared to the original input. Loss is informally or mathematically the opposite of inference accuracy. That is, the higher is tuple loss, the less reliably did reconstructive model 140 recognize an input.

For anomaly detection, high tuple loss, such as exceeding a threshold, may indicate that the tuple is anomalous, in which case an embodiment of computer 100 in a production environment may react in various ways such as alerting an operator, rejecting tuple 110 from further processing, further processing tuple 110 with heightened security constraints, diverting tuple 110 for intensive manual or automatic scrutiny, logging tuple 110, and/or adding tuple 110 into a training corpus for eventually retraining reconstructive model 140. For example, tuple 110 may be suspicious as malicious, accidentally erroneous, or indicative of a malfunction. For example, tuple 110 may be one or more of a network packet, an entry in a log of a server or a console, a database record, or a semi-structured document such as JavaScript® object notation (JSON) or extensible markup language (XML). In an embodiment, tuple 110 is a signaling system 7 (SS7) telecommunications message, and reconstructive model 140 is configured, trained, and operated according to techniques herein and as presented in related U.S. patent application Ser. No. 17/123,235.

1.9 Weighted Loss

As discussed above, an inference for anomaly detection can be based on a tuple loss that is an aggregation of value losses of features 121-122. A technical problem with loss aggregation is that, as explained above for feature selection, some features have more important values than others because those values have a greater effect on the inference.

Thus, original loss for one feature may be more important than an original loss for another feature.

Importances 130 indicate relative respective importance of values of features 121-122. The original losses of features 121-122 are respectively adjusted by applying importances 130 as respective weighting coefficients, as shown by arrow C, to calculate respective weighted losses for features 121-122 such as by multiplication. For example as shown, the weighted loss of feature 121 is 0.3×10%=3%. In other words, the value of feature 121 is less important, and its loss is decreased by weighting.

Conversely, the value of feature 122 is more important, and its loss is increased by weighting. Thus counterintuitively and due to weighting, a feature of relatively less original loss may have relatively more weighted loss than other features and vice versa. Implications of weighting are discussed below. The shown original losses and weighted losses are value losses as defined above.

1.10 Anomaly Detection

As mentioned earlier herein, training is not the only lifecycle phase of an ML model, and learning is not the only purpose of input reconstruction. The two lifecycle phases of laboratory training and production inferencing are rigid such that all machine learning occurs in the training environment, and no learning occurs in the production environment.

As explained above, anomaly detection entails recognizing that a complex input matches no learned pattern. In other words, anomaly detection entails recognizing unfamiliarity. By definition, an anomalous input is unlike other inputs. Whether a current input is by itself anomalous depends only on current reconstruction losses for the features of the current tuple, which has the following implications.

Accurate input reconstruction is eventually achieved during training. Without training, accurate reconstruction is impossible, in which case reconstruction loss is high. By definition, an unfamiliar input is any input that reconstructive model 140 was not trained for. Thus an unfamiliar input in training or in a production environment necessarily causes a high reconstruction loss.

An unfamiliar input is an anomaly, which is detectable due to its high reconstruction loss. Thus, reconstructive model 140 detects an anomaly when tuple loss, such as measured by mean squared error (MSE) or summation, exceeds an anomaly threshold as shown by arrow D and the decision diamond. For example, losses of features 121-122 may have a sum or mean. However due to weighting, a sum or mean of original losses may be more or less than a sum or mean of weighted losses.

The shown weighted losses are value losses but, by aggregation, weighted tuple loss may be calculated based on weighted value losses. Thus, weighting may cause value loss and/or tuple loss to increase as shown or decrease. In some counterintuitive cases, tuple 110 would have been anomalous according to original feature losses but instead is non-anomalous according to weighted tuple loss or vice versa. Thus, importances 130 may effectively reinterpret the output of reconstructive model 140 to increase the accuracy of reconstructive model 140. In an embodiment that applies importances during training as discussed later herein, increased accuracy due to importances accelerates training because a training accuracy threshold may be achieved sooner.

2.0 Loss Weighting Process

Figure 2:
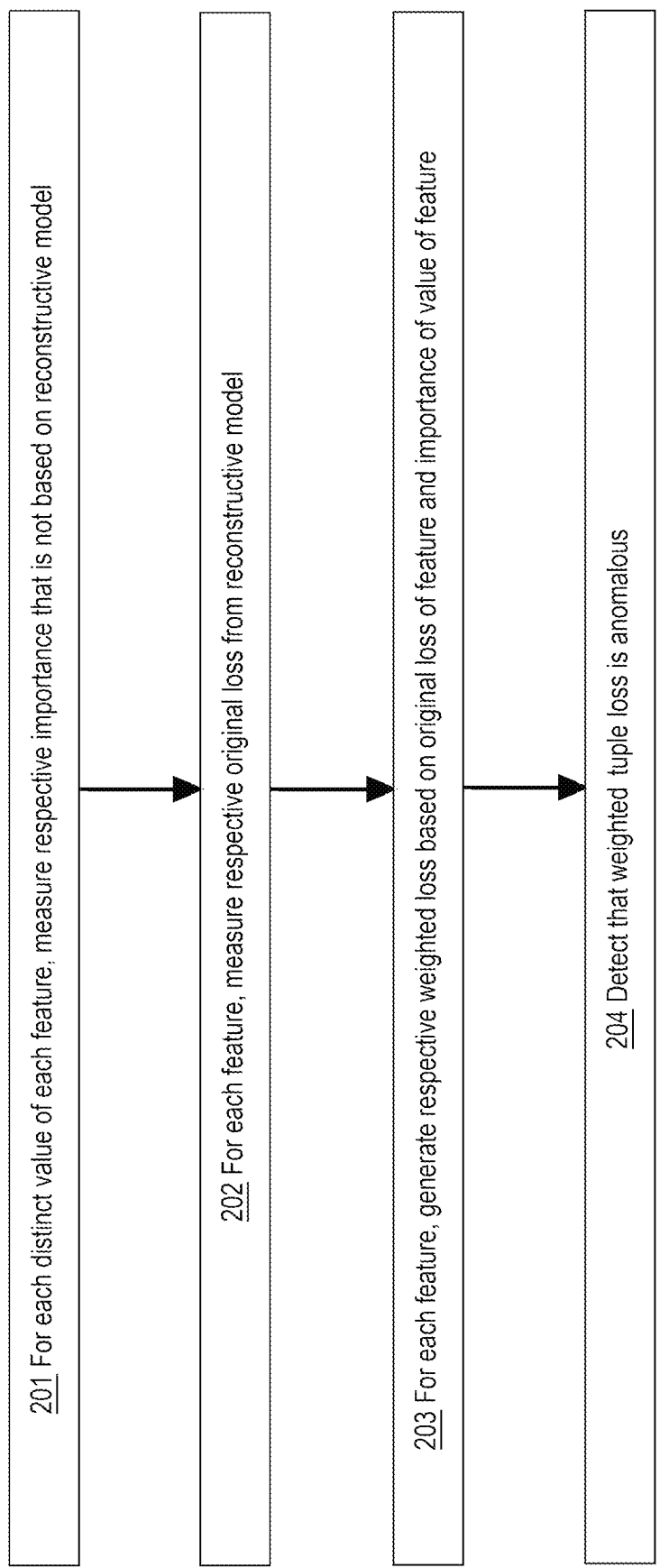
FIG. 2 is a flow diagram that depicts an example computer process to measure and apply feature value importances for training and/or anomaly detection.

FIG. 2 is a flow diagram that depicts an example process that computer 100 may perform to measure and apply feature value importances for training and/or anomaly detection. FIG. 2 is discussed with reference to FIG. 1.

Depending on the embodiment as explained earlier herein, measuring feature value importances 130 may occur before, during, or after training. For each possible value of each feature, step 201 measures a respective importance that is not based on reconstructive model 140. For example as explained earlier herein, step 201 may occur before reconstructive model 140 is selected. Mathematics of measuring importances 130 are discussed later herein.

Steps 202-204 occur during inferencing by reconstructive model 140. Step 202 occurs during training and during operation in production. In various embodiments as explained later herein, step 203 occurs during training, during production operation, or both. In various embodiments, step 204 occurs during production operation and does or does not occur during training.

For each feature of tuple 110, step 202 measures a respective original loss from reconstructive model 140 such as by measuring a difference between a reconstructed value of the feature and an input value of the feature as discussed earlier herein. For example, step 202 may apply reconstructive model 130 to tuple 110, as shown by arrow A, to cause reconstructive model 130 to generate an inference and, as shown by arrow B, original losses for features 121-122.

For each feature of tuple 110, step 203 generates a respective weighted loss based on the original loss of the feature and the importance of the feature. For example, step 203 may respectively apply importances 130 as coefficients to the original losses of features 121-122 to multiplicatively generate respective weighted losses of the features.

Step 204 detects that weighted tuple loss for tuple 110 is anomalous when an anomaly threshold is exceeded as shown by arrow D and the decision diamond. For example, weighted value losses of tuple 110 may be summed or averaged to calculate a weighted tuple loss such as by mean squared error (MSE). Step 204 need not occur during unsupervised training because reinforcement learning such as backpropagation is based on reconstruction loss instead of classification such as anomaly detection.

3.0 Example Loss Weighting Activities

Figure 3:
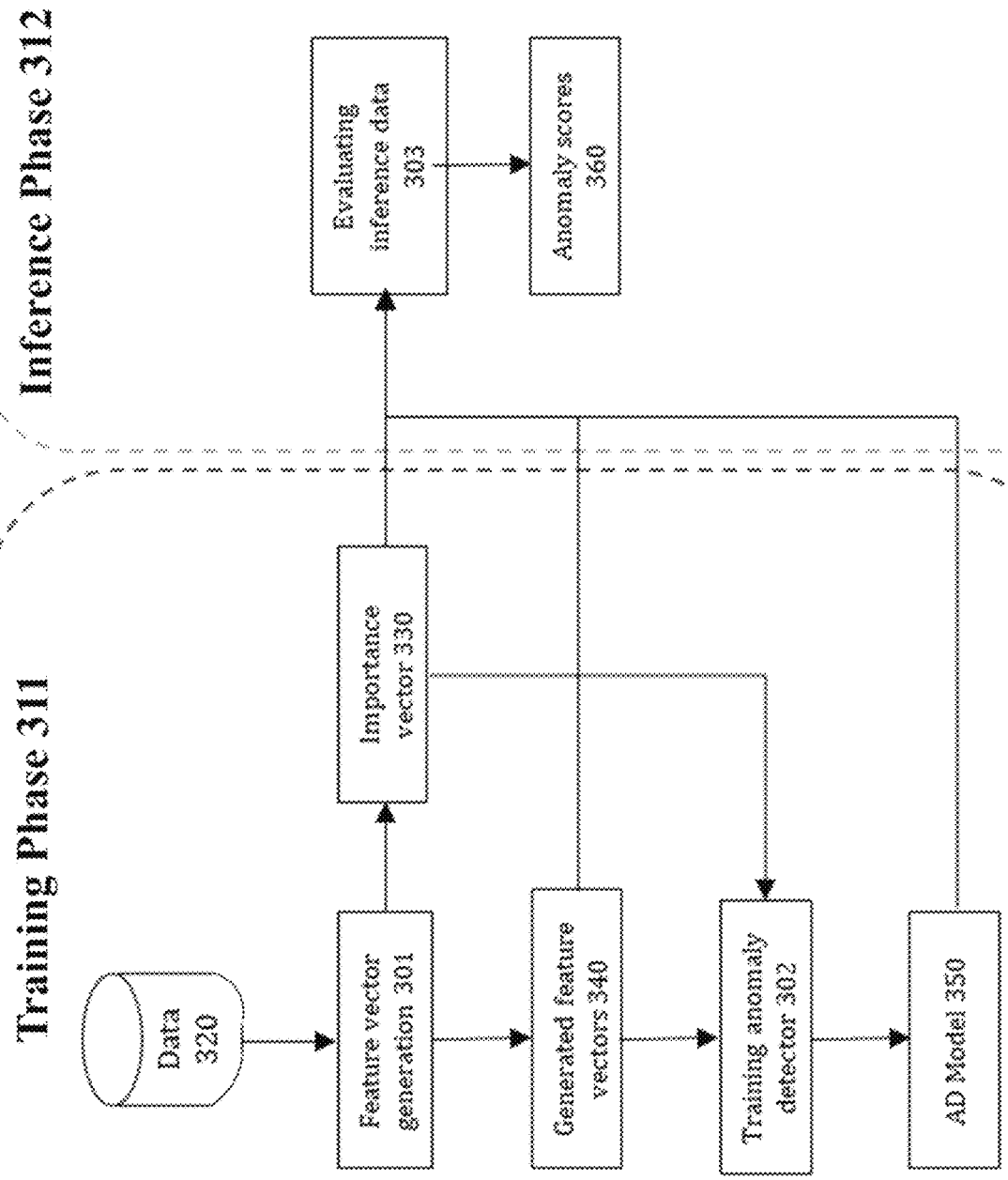
FIG. 3 is a flow diagram that depicts example computer activities that demonstrate various design choices in an implementation of the process of FIG. 2.

FIG. 3 is a flow diagram that depicts an example computer process that demonstrates various design choices in an implementation of the process of FIG. 2 in an embodiment. FIG. 3 is discussed with reference to FIG. 1.

The process of FIG. 3 includes steps 301-302 during training phase 311 and step 303 during inference phase 312. Both phases 311-312 may occur during training. Phases 311-312 are not necessarily temporal phases and may instead be functional phases. For example, inference phase 312 may occur as part of training phase 311. Inference phase 312 may also occur by itself during production operation.

Data 320 is a training corpus that contains many tuples. During training and as a design choice, step 301 performs both: a) measuring importances 130, shown as importance vector 330, and b) generation of a respective feature vector for each tuple in the training corpus, shown as generated feature vectors 340.

Step 302 uses generated feature vectors 340 and, as a design choice, importance vector 330 to train reconstructive model 130 for anomaly detection (AD), shown as AD model 350.

For each tuple, AD model 350 generates inference data that includes original feature losses. During inference phase 312, step 303 calculates weighted losses by applying importance vector 330 to the original losses. For each tuple, step 303 combines the weighted value losses, by summing or averaging, to calculate a respective weighted tuple loss for each tuple, shown as anomaly scores 360 that may be compared to an anomaly threshold to detect which tuples are anomalous and which tuples are not anomalous.

4.0 Example Loss Weighting Formulae

FIG. 4 depicts example mathematical formulae 401-404 that computer 100 may apply to prepare or use feature value importances in an embodiment. FIG. 4 is discussed with reference to FIG. 1.

As explained earlier herein: a) each possible value of each feature has an importance; b) one ordinary feature in a tuple is encoded as one feature in a feature vector; c) a categorical feature that represents a selection of one of multiple mutually exclusive choices is one-hot encoded; and c) unlike ordinary features, one-hot encoding needs a separate feature in the feature vector for each mutually exclusive choice that is possible for a categorical feature in a tuple. For example, a categorical feature whose value may be one of three mutually exclusive tea flavors may be one-hot encoded as three Boolean features in a feature vector. In a training corpus, the three tea flavors may occur with different frequencies such that more tuples specify one flavor than another flavor, and some flavor(s) might not occur at all in the training corpus.

Because a categorical feature in a tuple is encoded as multiple Boolean features in a feature vector, each of those Boolean features has its own respective importance. In other words, some of the mutually exclusive choices are more important than other choices for the same categorical feature. Thus, importances 130 may contain multiple importances for each categorical feature.

Although not shown, importances 130 may also contain multiple respective importances for the possible values of a non-categorical feature, even though the non-categorical feature is encoded as only one feature in a feature vector, regardless of which value actually occurs. Formulae 401-404 work well for categorical features and non-categorical (e.g. numeric) features. Likewise, formulae 401-404 work well for one-hot encoded features and for ordinary features that are ordinarily encoded (e.g. single number). In formulae 401-404, a feature may have multiple possible values. Regardless of the datatype/kind of the feature, the possible values are distinct (i.e. mutually exclusive) and have the following implications.

- The possible values of a categorical feature are the categorical values, some of which might not occur in the training corpus.
- Depending on the embodiment, the possible values of a real (e.g. floating point) feature are: a) limited to those that actually occur in the training corpus or b) are undefined and do not have respective importances.
- Depending on the embodiment, the possible values of an integer feature are: a) the full range of values that the integer datatype can encode, regardless of whether or not they occur in the training corpus, or b) treated in the same various ways as a real number above.

The above discussion reveals that some features or feature values need not have an associated importance. In an embodiment that multiplicatively applies an importance as a coefficient as discussed earlier herein, an importance value of one (i.e. multiplicative identity) may be used in the absence of an importance. In an embodiment, feature values of some features do not have importances, but the feature itself does have an importance. Thus, an embodiment may have a mix of features and feature values that variously do and do not have importances. Formulae 401-404 accommodate any such mix.

4.1 Importance Measurement

Formula 401 calculates importances of possible values of a feature according to the following algebraic terms.

F is a feature.

i is the index of a possible value for the feature, such as second of three color choices.

$v_i$ is the value of the i-th possible value such as red.

D is the training corpus.

D is a count of tuples in the training corpus.

m is a tuple in the training corpus.

$v_F(m)$ is the value of the feature in the tuple.

{m} is a count of tuples in the training corpus that have value $v_i$ for the categorical feature.

$r_{i,F}$ is a predefined scaling ratio as discussed below.

$w_{i,F}^{idf}$ is the importance of the i-th value of the feature, measured by inverse document frequency (idf) as explained below.

Here, inverse document frequency measures how rare is a possible value (i.e. mutually exclusive choice) in a training corpus, which is a numeric measurement in a range from zero to a limit that is the logarithm of #D, which usually is small and may be less than or greater than one. For example when the training corpus has a million tuples, and red is a color choice that is so rare that it only occurs in one tuple in the training corpus, then the inverse document frequency is the logarithm of a million, which is only six. If red instead is so common that every tuple in the training corpus is red, then the inverse document frequency is zero. In any case, the idf for a particular value of a feature in formula 401 is based on a ratio whose numerator is #D as shown and whose denominator is based solely on a count of tuples having the particular value for the feature. In an embodiment, #D is a count of only those tuples in the training corpus that have any actual value for the feature. For example, if the value of the feature in a tuple is missing, null, or one-hot encoded entirely as zeros, then the tuple is not counted in #D.

The importance of a possible value is directly proportionate to the inverse document frequency of the value. A technical problem with inverse document frequency is that it is devoid of semantics such that, without ratios for scaling, a rarer value would always have a higher importance than a more common value for the same feature, which is unrealistic. For example from a palette of hundreds of colors, puce (i.e. light maroon) may rarely be chosen and have a high inverse document frequency, but a human subject matter expert may know that: a) color does not matter when detecting an anomalous tuple or b) even though some colors may be significant for detecting an anomalous tuple, puce is not one of those colors.

Thus, the accuracy of raw inverse document frequency by itself as an importance measurement may be somewhat limited. In the above formula, r is a scaling ratio that a subject matter expert may separately predefine for each feature or for each possible value of a feature. For example, there may be a separate scaling ratio for each element of a feature vector, although scaling ratios are fixed once and reused for feature vectors of all tuples in the training corpus. As shown in formula 401, importance w is adjusted by multiplicatively applying scaling ratio r as a coefficient to increase the accuracy of importances 130.

4.2 Loss Weighting

Formulae 402-404 provide separate ways to measure weighted tuple loss based on importances 130 such as provided by formula 401. A distinction of formulae 402-404 versus formula 401 is that formula 401 uses subscript i to identify which value. Formulae 402-404 lack subscript i. For formulae 402-404, subscript i is unneeded because input x and feature j can be used instead to identify which value. Thus, importance w in formulae 402-404 is for the value in input x, not for the reconstructed value.

Formula 402 measures weighted tuple loss by mean squared error (MSE) according to the following algebraic terms.

Depending on the embodiment, N is a count of features in an input that is a tuple or a feature vector of the tuple. Thus, a one-hot encoded categorical feature may or may not count as multiple features.

x is the input that is a tuple or a feature vector of the tuple y is a reconstruction of the input j is the index of a feature $X_j$ is the value of the j-th feature in the input $y_j$ is the value of the reconstructed j-th feature $W_j$ is the importance of value $X_j$ in importances 130

$L_{mean}^w$ is the weighted MSE

Formula 403 measures weighted tuple loss instead as an absolute value with algebraic terms that are the same as in formula 402.

Formula 404 measures weighted tuple loss instead as cross entropy that in information theory is as follows. Counts (i.e. frequencies) of all occurrences, including duplicates, of any value of a same feature in a training corpus are a values distribution that may form a histogram. The frequencies of values are directly proportional to probabilities and may be normalized as probabilities. Thus, the values distribution of the feature is a statistical distribution.

A statistical distribution has quantifiable entropy, which is measured randomness. Cross entropy is a quantifiable difference between two different probability distributions, such as when the training corpus differs from reconstructed inputs due to reconstruction loss by reconstructive model 140. Thus, the training corpus has one values distribution for the feature and the reconstructed corpus from reconstructive model 140 has a slightly different values distribution, and formula 404 measures the difference between both values distributions as cross entropy.

However, cross entropy is more complex than merely an arithmetic difference between respective quantified entropies of two different distributions. For example, the training corpus may consist of two red tuples and one blue tuple, and reconstructive model 140 may wrongly reconstruct both originally red tuples instead as blue reconstructed tuples and the originally blue tuple instead as a red reconstructed tuple. Both the training corpus and the reconstructed corpus have a same quantified entropy, but the cross entropy is not low. Likewise even if both the training corpus and the reconstructed corpus agree on how many tuples are red, cross entropy is not low unless both the training corpus and the reconstructed corpus agree on exactly which tuples are red.

As explained above, cross entropy compares two populations that are or, as follows, are not the training corpus and the reconstructed corpus. For measuring weighted tuple loss by formula 404, the two populations instead are only one original tuple and one reconstructed tuple. Formula 404 measures weighted tuple loss with algebraic terms that are the same as in formula 402 as explained above.

Standard implementations of information theory formulae such as cross entropy are available in Python® libraries such as scikit-learn and Keras. In other embodiments, weighted tuple loss instead involves a different measurement that is somewhat similar to cross entropy such as any of:

logistic loss, log loss, or

Kullback-Leibler (KL) divergence.

5.0 Additional Activities For Measuring Confidence

Figure 5:
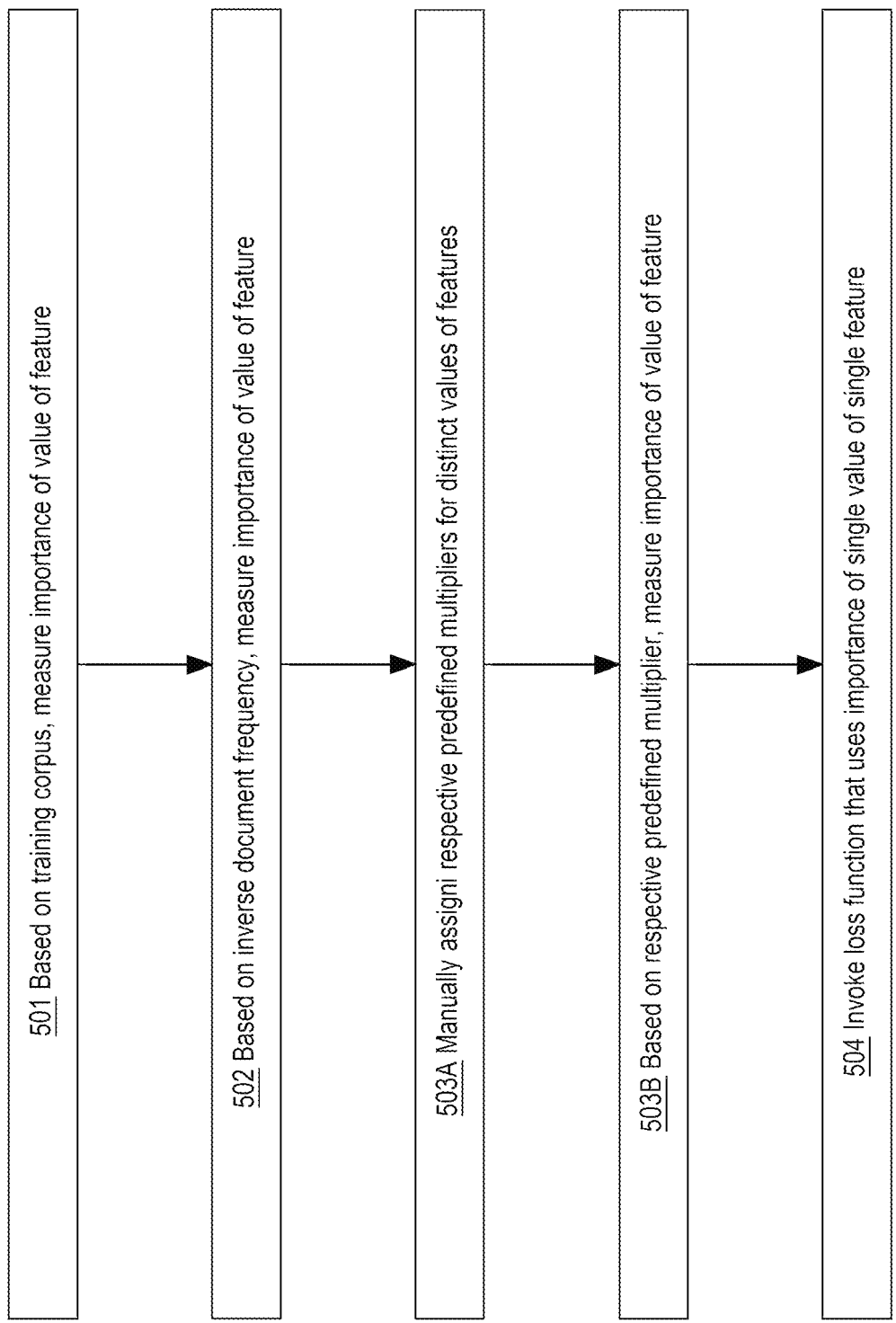
FIG. 5 is a flow diagram that depicts an example computer process to measure and apply feature value importances for training and/or anomaly detection.

FIG. 5 is a flow diagram that depicts example activities that a computer, such as an implementation of computer 100, may perform to measure and use feature value importances. FIG. 5 is discussed with references to FIGS. 1 and 4.

Steps 501-502 and 503B provide complementary ways of measuring the importance of a value of a feature. Various embodiments may implement various combinations of steps 501-502 and 503B that may be combined into a same step. That is, no matter how many of steps 501-502 and 503B cooperate, only one importance is measured for a value of a feature.

Based on a training corpus, step 501 measures the importance of a value of a feature. For example as discussed earlier herein, importances 130 may be measured based on the values distribution of the feature in the training corpus. For example, step 501 may use formula 401 that uses a training corpus to measure importance.

Based on inverse document frequency, step 502 measures the importance of a value of a feature. For example, step 501 may use formula 401 that measures inverse document frequency based solely on (e.g. duplicate) values of the feature that actually occur in a population such as a training corpus.

As explained earlier herein, raw importances of feature values may be multiplicatively adjusted based on respective predefined coefficients that reflect significances of values in an application domain that do not correspond to value frequencies. For example, a red traffic light is operationally more significant than a yellow traffic light, even though red and yellow occur in a traffic light with a same frequency. For example, formula 401 uses scaling ratio r to adjust the raw importance of a value of a feature.

Step 503A is preparatory and may occur long before step 503B and before or after creation of a training corpus. Step 503A manually assigns respective predefined multipliers, such as scaling ratio r in formula 401, for distinct values of features 121-122. For example, a domain subject matter expert may perform step 503A to reflect application semantics such as red versus yellow traffic lights. For example, scaling ratio r may be reused unchanged as a training corpus and/or importances 130 evolve or are entirely replaced.

Based on the respective predefined multiplier that was assigned in step 503A to a value of a feature, step 503B measures the importance of the value of the feature. For example, step 503B may multiplicatively apply the predefined multiplier as a coefficient to the raw importance of the value. For example, step 503B may use formula 401 to apply scaling ratio r as described earlier herein.

Step 504 invokes a loss function that uses the importance of a single value of a single feature. For example, there may be a single loss function that is reusable to measure weighted loss of any value of any feature. For example to measure weighted loss, the loss function may, without needing to know which feature in which tuple is involved, accept an input value, a reconstructed value, and an importance of the input value. Various embodiments of step 504 may variously use any of formulae 402-404 to measure weighted loss.

6.0 Exemplary Sets of Embodiments

With reference to FIG. 1, the following exemplary Sets A-B of embodiments of computer 100 combine the following design choices in many feasible ways to demonstrate integration and deployment flexibility of techniques herein. These design choices may be complementary or, in some cases, logically mutually exclusive. An embodiment may be a member of Set A or B or both.

Various embodiments in Set A are configured to perform at least one of:
  training reconstructive model 140 based on importances 130,
  training reconstructive model 140 not based on importances 130,
  training reconstructive model 140 before measuring importances 130, and
  training reconstructive model 140 after measuring importances 130.

Various embodiments in Set B are configured to perform at least one of:
  generating weighted losses while training reconstructive model 140 and after training reconstructive model 140,
  generating weighted losses while training reconstructive model 140 but not after training reconstructive model 140, and
  generating weighted losses after training reconstructive model 140 but not while training reconstructive model 140.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
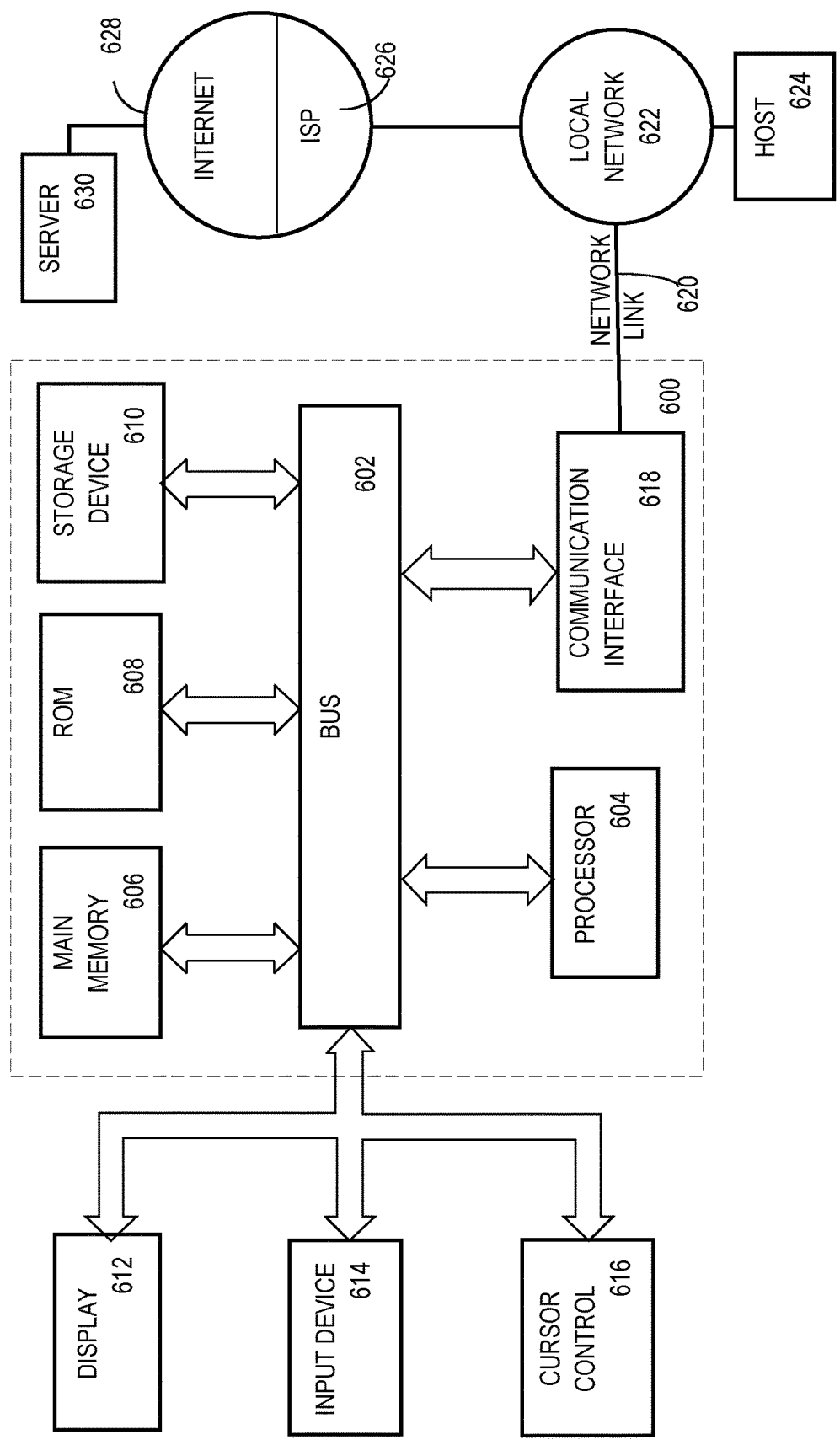
FIG. 6 is a block diagram that illustrates a computer system upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

Software Overview

Figure 7:
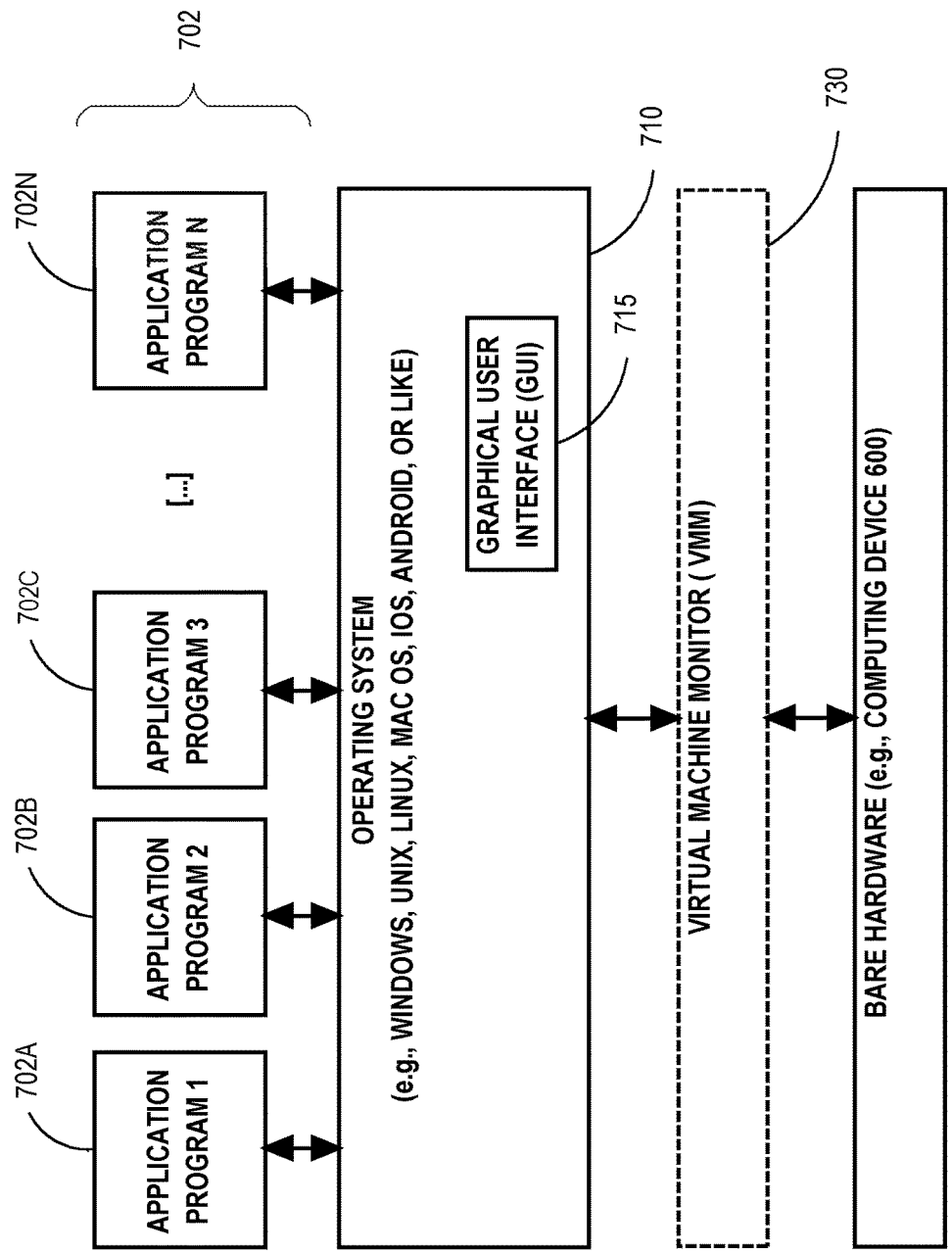
FIG. 7 is a block diagram that illustrates a basic software system that may be employed for controlling the operation of a computing system.

FIG. 7 is a block diagram of a basic software system 700 that may be employed for controlling the operation of computing system 600. Software system 700 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 700 is provided for directing the operation of computing system 600. Software system 700, which may be stored in system memory (RAM) 606 and on fixed storage (e.g., hard disk or flash memory) 610, includes a kernel or operating system (OS) 710.

The OS 710 manages low-level aspects of computer operation, including managing execution of processes, memory allocation, file input and output (I/O), and device I/O. One or more application programs, represented as 702A, 702B, 702C . . . 702N, may be "loaded" (e.g., transferred from fixed storage 610 into memory 606) for execution by the system 700. The applications or other software intended for use on computer system 600 may also be stored as a set of downloadable computer-executable instructions, for example, for downloading and installation from an Internet location (e.g., a Web server, an app store, or other online service).

Software system 700 includes a graphical user interface (GUI) 715, for receiving user commands and data in a graphical (e.g., "point-and-click" or "touch gesture") fashion. These inputs, in turn, may be acted upon by the system 700 in accordance with instructions from operating system 710 and/or application(s) 702. The GUI 715 also serves to display the results of operation from the OS 710 and application(s) 702, whereupon the user may supply additional inputs or terminate the session (e.g., log off).

OS 710 can execute directly on the bare hardware 720 (e.g., processor(s) 604) of computer system 600. Alternatively, a hypervisor or virtual machine monitor (VMM) 730 may be interposed between the bare hardware 720 and the OS 710. In this configuration, VMM 730 acts as a software "cushion" or virtualization layer between the OS 710 and the bare hardware 720 of the computer system 600.

VMM 730 instantiates and runs one or more virtual machine instances ("guest machines"). Each guest machine comprises a "guest" operating system, such as OS 710, and one or more applications, such as application(s) 702, designed to execute on the guest operating system. The VMM 730 presents the guest operating systems with a virtual operating platform and manages the execution of the guest operating systems.

In some instances, the VMM 730 may allow a guest operating system to run as if it is running on the bare hardware 720 of computer system 600 directly. In these instances, the same version of the guest operating system configured to execute on the bare hardware 720 directly may also execute on VMM 730 without modification or reconfiguration. In other words, VMM 730 may provide full hardware and CPU virtualization to a guest operating system in some instances.

In other instances, a guest operating system may be specially designed or configured to execute on VMM 730 for efficiency. In these instances, the guest operating system is "aware" that it executes on a virtual machine monitor. In other words, VMM 730 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Machine Learning Models

A machine learning model is trained using a particular machine learning algorithm. Once trained, input is applied to the machine learning model to make a prediction, which may also be referred to herein as a predicated output or output. Attributes of the input may be referred to as features and the values of the features may be referred to herein as feature values.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depends on the machine learning algorithm.

In supervised training, training data is used by a supervised training algorithm to train a machine learning model. The training data includes input and a "known" output. In an embodiment, the supervised training algorithm is an iterative procedure. In each iteration, the machine learning algorithm applies the model artifact and the input to generate a predicated output. An error or variance between the predicated output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria is met.

In a software implementation, when a machine learning model is referred to as receiving an input, being executed, and/or generating an output or predication, a computer system process executing a machine learning algorithm applies the model artifact against the input to generate a predicted output. A computer system process executes a machine learning algorithm by executing software configured to cause execution of the algorithm. When a machine learning model is referred to as performing an action, a computer system process executes a machine learning algorithm by executing software configured to cause performance of the action.

Classes of problems that machine learning (ML) excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e. configurable) implementations of best of breed machine learning algorithms may be found in open source libraries such as Google's® TensorFlow® for Python® and C++ or Georgia Institute of Technology's® MLPack for C++. Shogun is an open source C++ ML library with adapters for several programing languages including C#, Ruby, Lua®, Java®, MatLab®, R, and Python®.

Artificial Neural Networks

An artificial neural network (ANN) is a machine learning model that at a high level models a system of neurons interconnected by directed edges. An overview of neural networks is described within the context of a layered feedforward neural network. Other types of neural networks share characteristics of neural networks described below.

In a layered feed forward network, such as a multilayer perceptron (MLP), each layer comprises a group of neurons. A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neuron.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input neuron, the activation value is simply an input value for the input. For an activation neuron, the activation value is the output of the respective activation function of the activation neuron.

Each edge from a particular neuron to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation neuron, the activation function of the neuron is applied to the weighted activation values and the bias.

Illustrative Data Structures for Neural Network

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer L−1 to a layer L. Given the number of neurons in layer L−1 and L is N[L−1] and N[L], respectively, the dimensions of matrix W is N[L−1] columns and N[L] rows.

Biases for a particular layer L may also be stored in matrix B having one column with N[L] rows.

The matrices W and B may be stored as a vector or an array in RAM memory, or comma separated set of values in memory. When an artifact is persisted in persistent storage, the matrices W and B may be stored as comma separated values, in compressed and/serialized form, or other suitable persistent form.

A particular input applied to a neural network comprises a value for each input neuron. The particular input may be stored as vector. Training data comprises multiple inputs, each being referred to as sample in a set of samples. Each sample includes a value for each input neuron. A sample may be stored as a vector of input values, while multiple samples may be stored as a matrix, each row in the matrix being a sample.

When an input is applied to a neural network, activation values are generated for the hidden layers and output layer. For each layer, the activation values for may be stored in one column of a matrix A having a row for every neuron in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of neurons and/or edges determines the size of matrices needed to implement a neural network. The smaller the number of neurons and edges in a neural network, the smaller matrices and amount of memory needed to store matrices. In addition, a smaller number of neurons and edges reduces the amount of computation needed to apply or train a neural network. Less neurons means less activation values need be computed, and/or less derivative values need be computed during training.

Properties of matrices used to implement a neural network correspond neurons and edges. A cell in a matrix W represents a particular edge from a neuron in layer L−1 to L. An activation neuron represents an activation function for the layer that includes the activation function. An activation neuron in layer L corresponds to a row of weights in a matrix W for the edges between layer L and L−1 and a column of weights in matrix W for edges between layer L and L+1. During execution of a neural network, a neuron also corresponds to one or more activation values stored in matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that is not parallelizable. Thus, network depth (i.e. amount of layers) may cause computational latency. Deep learning entails endowing a multilayer perceptron (MLP) with many layers. Each layer achieves data abstraction, with complicated (i.e. multidimensional as with several inputs) abstractions needing multiple layers that achieve cascaded processing. Reusable matrix based implementations of an ANN and matrix operations for feed forward processing are readily available and parallelizable in neural network libraries such as Google's® TensorFlow® for Python® and C++, OpenNN for C++, and University of Copenhagen's fast artificial neural network (FANN). These libraries also provide model training algorithms such as backpropagation.

Backpropagation

An ANN's output may be more or less correct. For example, an ANN that recognizes letters may mistake an I as an L because those letters have similar features. Correct output may have particular value(s), while actual output may have somewhat different values. The arithmetic or geometric difference between correct and actual outputs may be measured as error according to a loss function, such that zero represents error free (i.e. completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depends on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e. ceases to reduce) or vanishes beneath a threshold (i.e. approaches zero). Example mathematical formulae and techniques for feedforward multilayer perceptron (MLP), including matrix operations and backpropagation, are taught in related reference "EXACT CALCULATION OF THE HESSIAN MATRIX FOR THE MULTI-LAYER PERCEPTRON," by Christopher M. Bishop.

Model training may be supervised or unsupervised. For supervised training, the desired (i.e. correct) output is already known for each example in a training set. The training set is configured in advance by (e.g. a human expert) assigning a categorization label to each example. For example, the training set for optical character recognition may have blurry photographs of individual letters, and an expert may label each photo in advance according to which letter is shown. Error calculation and backpropagation occurs as explained above.

Autoencoder

Unsupervised model training is more involved because desired outputs need to be discovered during training. Unsupervised training may be easier to adopt because a human expert is not needed to label training examples in advance. Thus, unsupervised training saves human labor. A natural way to achieve unsupervised training is with an autoencoder, which is a kind of ANN. An autoencoder functions as an encoder/decoder (codec) that has two sets of layers. The first set of layers encodes an input example into a condensed code that needs to be learned during model training. The second set of layers decodes the condensed code to regenerate the original input example. Both sets of layers are trained together as one combined ANN. Error is defined as the difference between the original input and the regenerated input as decoded. After sufficient training, the decoder outputs more or less exactly whatever is the original input.

An autoencoder relies on the condensed code as an intermediate format for each input example. It may be counter-intuitive that the intermediate condensed codes do not initially exist and instead emerge only through model training. Unsupervised training may achieve a vocabulary of intermediate encodings based on features and distinctions of unexpected relevance. For example, which examples and which labels are used during supervised training may depend on somewhat unscientific (e.g. anecdotal) or otherwise incomplete understanding of a problem space by a human expert. Whereas, unsupervised training discovers an apt intermediate vocabulary based more or less entirely on statistical tendencies that reliably converge upon optimality with sufficient training due to the internal feedback by regenerated decodings. Techniques for unsupervised training of an autoencoder for anomaly detection based on reconstruction loss is taught in non-patent literature (NPL) "VARIATIONAL AUTOENCODER BASED ANOMALY DETECTION USING RECONSTRUCTION PROBABILITY", Special Lecture on IE. 2015 Dec. 27; 2(1):1-18 by Jinwon An et al.

Principal Component Analysis

Principal component analysis (PCA) provides dimensionality reduction by leveraging and organizing mathematical correlation techniques such as normalization, covariance, eigenvectors, and eigenvalues. PCA incorporates aspects of feature selection by eliminating redundant features. PCA can be used for prediction. PCA can be used in conjunction with other ML algorithms.

Random Forest

A random forest or random decision forest is an ensemble of learning approaches that construct a collection of randomly generated nodes and decision trees during a training phase. Different decision trees of a forest are constructed to be each randomly restricted to only particular subsets of feature dimensions of the data set, such as with feature bootstrap aggregating (bagging). Therefore, the decision trees gain accuracy as the decision trees grow without being forced to over fit training data as would happen if the decision trees were forced to learn all feature dimensions of the data set. A prediction may be calculated based on a mean (or other integration such as soft max) of the predictions from the different decision trees.

Random forest hyper-parameters may include: number-of-trees-in-the-forest, maximum-number-of-features-considered-for-splitting-a-node, number-of-levels-in-each-decision-tree, minimum-number-of-data-points-on-a-leaf-node, method-for-sampling-data-points, etc.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   measuring without using a reconstructive model:
   a) for a distinct first categorical value of a particular feature of a plurality of features, a distinct first importance and
   b) for a distinct second categorical value of the particular feature of the plurality of features, a distinct second importance; and
   performing by a network switch:
   i) measuring, for a network packet, a loss from the reconstructive model for the particular feature of the plurality of features;
   ii) increasing the loss of the particular feature based on the second importance for the second categorical value of the particular feature;
   iii) detecting, based on said increasing, that the network packet is anomalous; and
   iv) rejecting, in response to said detecting, the network packet.

2. The method of claim 1 wherein said measuring the first importance is based on an inverse document frequency that is based solely on categorical values of the particular feature.

3. The method of claim 2 wherein:
   the particular feature is one-hot encoded;

the inverse document frequency comprises a ratio having a denominator that is based solely on a count of the first categorical value of the particular feature.

4. The method of claim 3 wherein each of the denominator and said count of the first categorical value of the particular feature is a count of the first categorical value of the particular feature in a training corpus.

5. The method of claim 3 wherein:
a training corpus comprises a plurality of tuples;
each tuple in the plurality of tuples contains the plurality of features;
the ratio has a numerator that is not based on tuples in the plurality of tuples that lack a categorical value of the particular feature.

6. The method of claim 1 further comprising manually assigning:
a first predefined multiplier to the first categorical value of the particular feature and
a second predefined multiplier to the second categorical value of the particular feature.

7. The method of claim 1 further comprising at least one selected from a group consisting of:
training the reconstructive model based on the first importance,
training the reconstructive model before said measuring the first importance, and
training the reconstructive model after said measuring the first importance.

8. The method of claim 1 wherein one is selected from a group consisting of:
said increasing occurs while training the reconstructive model and after training the reconstructive model,
said increasing occurs while training the reconstructive model but not after training the reconstructive model, and
said increasing occurs after training the reconstructive model but not while training the reconstructive model.

9. The method of claim 1 wherein said increasing comprises a loss function accepting the first importance without the second importance.

10. One or more non-transitory computer-readable media storing instructions that, when executed by one or more processors, cause:
measuring without using a reconstructive model:
a) for a distinct first categorical value of a particular feature of a plurality of features, a distinct first importance and
b) for a distinct second categorical value of the particular feature of the plurality of features, a distinct second importance;
performing by a network switch:
i) measuring, for a network packet, a loss from the reconstructive model for the particular feature of the plurality of features;
ii) increasing the loss of the particular feature based on the second importance for the second categorical value of the particular feature;
iii) detecting, based on said increasing, that the network packet is anomalous; and
iv) rejecting, in response to said detecting, the network packet.

11. The one or more non-transitory computer-readable media of claim 10 wherein said measuring the first importance is based on an inverse document frequency that is based solely on categorical values of the particular feature.

12. The one or more non-transitory computer-readable media of claim 11 wherein:
the particular feature is one-hot encoded;
the inverse document frequency comprises a ratio having a denominator that is based solely on a count of the first categorical value of the particular feature.

13. The one or more non-transitory computer-readable media of claim 12 wherein each of the denominator and said count of the first categorical value of the particular feature is a count of the first categorical value of the particular feature in a training corpus.

14. The one or more non-transitory computer-readable media of claim 12 wherein:
a training corpus comprises a plurality of tuples;
each tuple in the plurality of tuples contains the plurality of features;
the ratio has a numerator that is not based on tuples in the plurality of tuples that lack a categorical value of the particular feature.

15. The one or more non-transitory computer-readable media of claim 10 wherein the instructions further cause at least one selected from a group consisting of:
training the reconstructive model based on the first importance,
training the reconstructive model before said measuring the first importance, and
training the reconstructive model after said measuring the first importance.

16. The one or more non-transitory computer-readable media of claim 10 wherein one is selected from a group consisting of:
said increasing occurs while training the reconstructive model and after training the reconstructive model,
said increasing occurs while training the reconstructive model but not after training the reconstructive model, and
said increasing occurs after training the reconstructive model but not while training the reconstructive model.

17. The one or more non-transitory computer-readable media of claim 10 wherein said increasing comprises a loss function accepting the first importance without the second importance.

* * * * *